United States Patent
McEwan

(10) Patent No.: US 9,552,193 B2
(45) Date of Patent: Jan. 24, 2017

(54) AUTOMATED COMPILER SPECIALIZATION FOR GLOBAL OPTIMIZATION

(75) Inventor: Colin A. McEwan, Midlothian (GB)

(73) Assignees: MStar Semiconductor, Inc. (TW); MStar Semiconductor, Inc., Grand Cayman (KY); MStar Software R&D, Ltd., Shenzhen (CN)

( * ) Notice: Subject to any disclaimer, the term of this patent is extended or adjusted under 35 U.S.C. 154(b) by 529 days.

(21) Appl. No.: 13/596,538

(22) Filed: Aug. 28, 2012

(65) Prior Publication Data

US 2014/0026127 A1  Jan. 23, 2014

(30) Foreign Application Priority Data

Jul. 18, 2012  (EP) .................................... 12176842

(51) Int. Cl.
*G06F 9/45* (2006.01)
*G06F 9/44* (2006.01)

(52) U.S. Cl.
CPC ................. *G06F 8/37* (2013.01); *G06F 8/443* (2013.01)

(58) Field of Classification Search
CPC .................................. G06F 8/37; G06F 8/443
USPC ......................................................... 717/146
See application file for complete search history.

(56) References Cited

U.S. PATENT DOCUMENTS

| | | | |
|---|---|---|---|
| 6,308,320 B1* | 10/2001 | Burch | G06F 8/48 717/145 |
| 6,983,459 B1* | 1/2006 | Prosser et al. | 717/158 |
| 2005/0125783 A1* | 6/2005 | Tatge et al. | 717/152 |
| 2012/0089962 A1 | 4/2012 | Centonze et al. | |
| 2014/0289700 A1* | 9/2014 | Srinivasaraghavan et al. | 717/106 |

OTHER PUBLICATIONS

Taiwan Office Action dated May 9, 2014 citing prior art, 12 pages.

* cited by examiner

*Primary Examiner* — Li B. Zhen
*Assistant Examiner* — Sen Chen
(74) *Attorney, Agent, or Firm* — Edell, Shapiro & Finnan, LLC

(57) ABSTRACT

Techniques are provided herein for the offline static analysis of a stable code base in order to build a compiler and tools specialized to that code base. This allows global code base knowledge to be applied earlier in the compilation process giving better opportunities for optimization. The offline static analysis produces specialized compiler components that are then used to rebuild the compiler. This results, over time, in a compiler specialized to the code base with improved optimization after every compiler release cycle.

9 Claims, 4 Drawing Sheets

AUTOMATED COMPILER SPECIALIZATION FOR GLOBAL OPTIMIZATION

FIELD OF THE INVENTION

The present disclosure relates to compilation and optimization of software programs, and more specifically to the use of offline static analysis of a stable code base to build a compiler specialized to that code base, allowing code base specific knowledge to be applied earlier in the compilation process, thus improving the quality of optimization, reducing compilation time, and thereby reducing software development time.

BACKGROUND OF THE INVENTION

A compiler is a computer program that transforms source code written in a high level programming language into another lower level language, typically assembly language or machine code, to ultimately create an executable program. When transforming the high level source code the compiler determines the syntactical correctness of the source code, produces an efficient run-time organization of the object code, and formats the output according to the requirements of an assembler or linker.

Compilation of a software program typically involves having each of its source files, or objects in source code format, individually compiled by a compiler into processor-executable native or machine code files. These compiled source files are then processed by a linker, which combines the compiled files to produce a complete executable program. A compiler may perform many or all of the following operations: lexical analysis, preprocessing, parsing, semantic analysis, code generation, and code optimization.

Code optimization is the process of tuning the output of the compiler to minimize or maximize some attributes of an executable computer program. The most common requirements are to minimize the time taken to execute a program; or to minimize the amount of memory occupied. Compiler optimization is generally implemented using a sequence of optimizing transformations, algorithms which take a program and transform it to produce a semantically equivalent output program that uses fewer resources.

One prior solution to optimize the executable program is to have the compiler perform all the optimizing transformations only on the object file it compiles. Known optimization operations performed by a compiler typically include base binding, function cloning, and partial evaluation.

However, one problem of the above-described prior solution is that the compilers do not have the knowledge of the entire program during compilation because object files are compiled separately. This means that many optimizing transformation operations at compile-time depend on information that can only be available when linking the object files. Therefore, even though a compiler is capable of performing an optimizing transformation operation based on a particular piece of information, the compiler is unable to exploit the global characteristics of the program, such as, the distribution of operation codes or the frequency of instruction sequences.

Link-time optimization is a type of prior-art program optimization solution performed on a program at link time when the global characteristics of the program are known. As the linker is in the process of merging the object files into a single file, or immediately thereafter, link-time optimization capabilities apply various forms of optimization on the newly merged file. Link time optimization may also involve the recompiling of the complete program, however this is computationally expensive.

A further prior-art optimization solution is interprocedural optimization (IPO) which also analyzes the entire program. Interprocedural optimization attempts to reduce or eliminate duplicate calculations, improve memory usage and simplify iterative processes by using typical optimization techniques such as procedure inlining, interprocedural dead code elimination, interprocedural constant propagation, and procedure reordering. The IPO process can occur at any step in the compilation sequence and can form part of the link-time optimization.

These existing solutions provide for either, quick compilation and linking time without aggressive global optimisation, or aggressive global optimisation at the expense of significant compile-time or link-time overhead.

The invention described herein provides techniques for offline static analysis of a stable code base such that global code base specific knowledge can be applied earlier in the compilation process to improve optimization. The offline static analysis produces specialized compiler components that are then used to rebuild the compiler. This results, over time, in a compiler specialized to the code base with improved optimization after every compiler release cycle while maintaining efficient compilation time. It is assumed that the process of building and releasing the compiler for use will happen regularly as a matter of course, and so there will be regular opportunity for updating codebase-specific knowledge in the compiler if the codebase should change and evolve over time.

SUMMARY OF THE INVENTION

Techniques are provided herein for the offline static analysis of a stable code base in order to build a compiler and tools specialised to that code base. Prior art optimisation solutions can be limited by the lack of global knowledge of the code base, or suffer extended compilation times if aggressive optimisation is required. The techniques described herein allow global code base knowledge to be applied earlier in the compilation process giving better opportunities for optimisation. For example, common subsequences can be identified prior to register allocation allowing code sequences to be reused where they would otherwise differ due to the use of different registers. This allows the code size to be reduced further in circumstances which the prior art solutions would be unable to improve.

Static automated analysis of the existing codebase is performed on information emitted by the existing tool chain during a normal build, to, for example, find re-usable patterns in the code base. The analysis identifies the common code sequences and produces the assembler source for the library functions, the peephole pattern to detect the subsequences in the application code, and the supporting C source, in the case of the GNU Compiler Collection (GCC). The analysis program uses the information collected to build specialised compiler components which are then used to build a modified compiler and library.

Additionally, the analysis program may gather data on the number and location of calls to functions, and other information on the structure of the program that may be used as heuristics to guide decisions in later compilation.

The specialised compiler identifies instances of common sequences during compilation, emits library calls for the common sequences, and continues to optimise the code around the library calls using existing optimisations.

The compiler level identification of re-usable patterns creates little compiler and link-time overhead and allows the matching of patterns independent of register allocation, while the existing infrastructure is used for pattern recognition and further optimisation.

BRIEF DESCRIPTION OF THE DRAWINGS

For a better understanding of the present invention, reference is made, by way of example, to the following drawings. It is to be noted, however, that the appended drawings illustrate only typical embodiments and are not to be considered limiting of its scope.

DESCRIPTION OF EXAMPLE EMBODIMENTS

Figure 1:
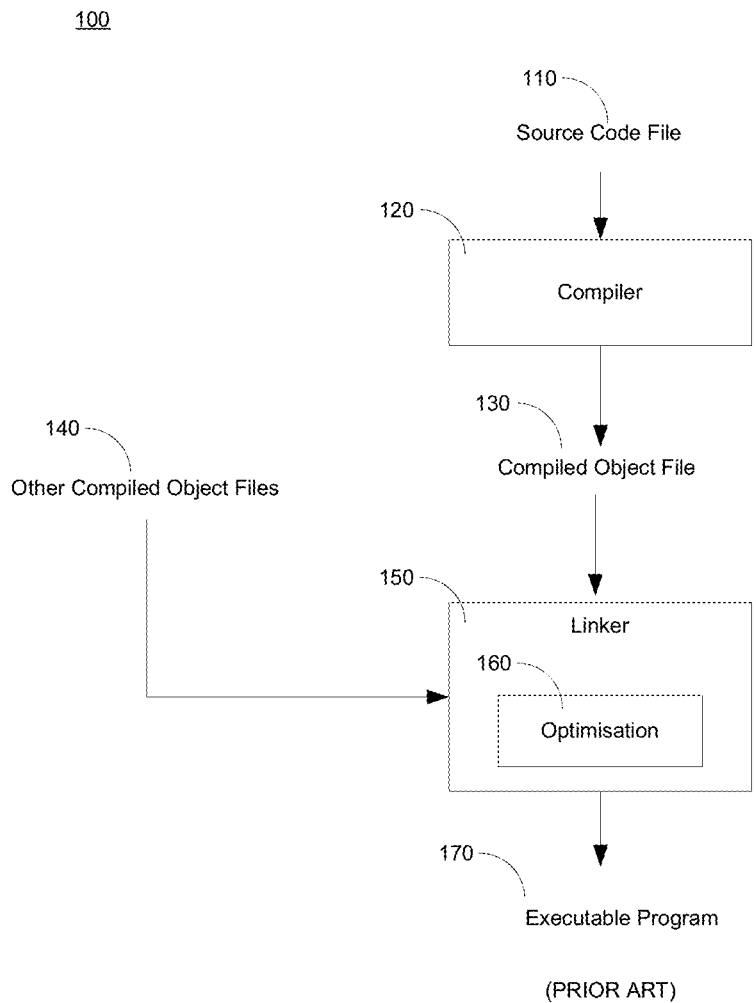
FIG. 1 shows a flow diagram of a typical prior-art compilation sequence.

Referring to FIG. 1, a flow diagram of a typical prior-art compilation sequence 100 is shown. Compilation of a software program typically involves having each of its source files 110, or objects in source code format, individually compiled by a compiler 120 into a processor-executable native or machine code file, a compiled object file 130. The compiled object files 130-140 are then processed by a linker 150 using link time optimisation 160, combining the compiled object files to produce a complete executable program 170. However, the compiler cannot exploit global properties of the whole program as each file is compiled individually and the linker only has visibility of compiled binaries which may require recompilation if complex optimization is required.

Figure 2:
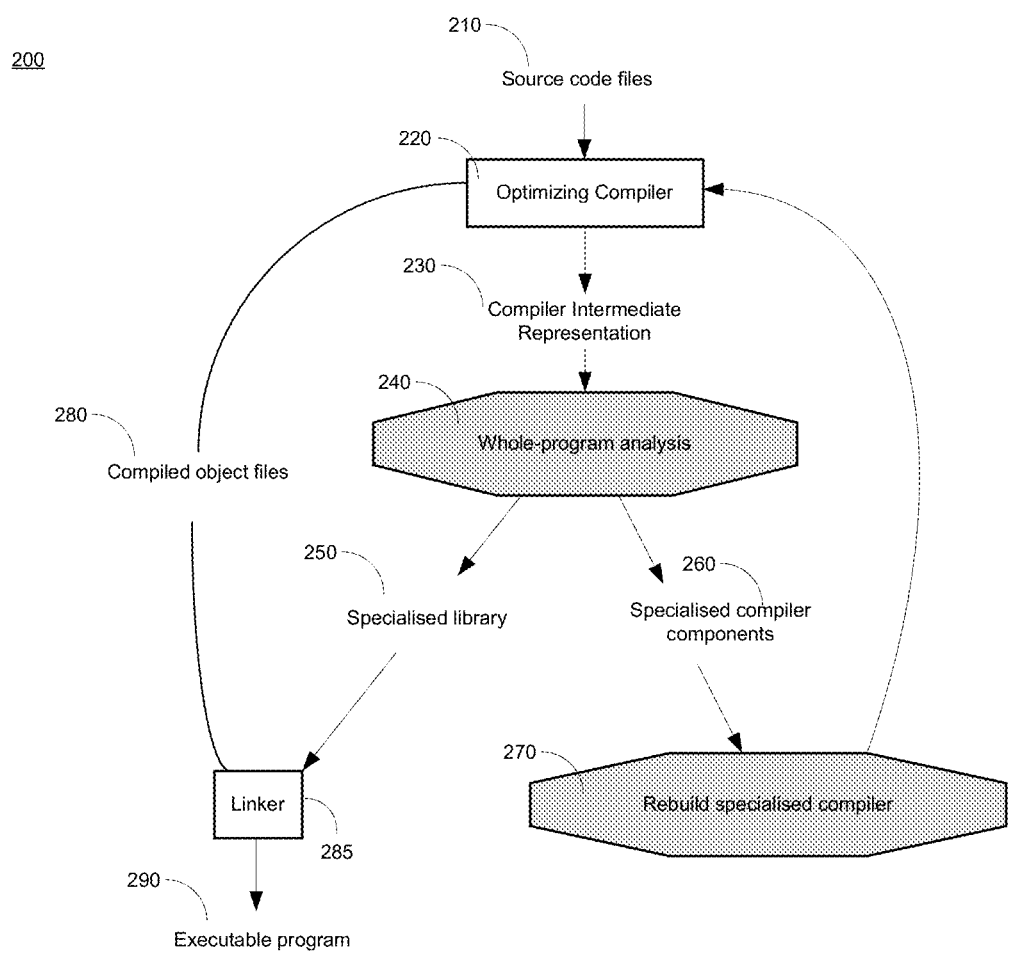
FIG. 2 shows a flow diagram of the embodiment of a compilation sequence using whole program analysis to produce specialised components in order to rebuild the compiler.

Referring to FIG. 2, a flow diagram of a compilation sequence using whole program analysis and compiler rebuilding 200 of the embodiment is shown. The whole program analysis is used to create a specialized compiler adapted to the stable code base, which is then available as the optimising compiler for the next iteration of the code development process.

At each iteration of the code base development, the source code files 210 are compiled using the optimizing compiler 220, which gathers information about the semantics, structure and control flow of the code necessary to compile the source code to optimised object files. The compiler outputs the compiled object files 280, and also creates an intermediate representation 230 of the compiled code. The intermediate representation 230 is a machine and source language independent version of the original source code.

In one embodiment of the invention the language used for the intermediate representation 230 is the GCC Register Transfer Language (RTL), which specifies the operations, register communication and timing of the steps required to carry out the higher level instructions. The RTL representation of the compiled object code for the whole code base is used as the input for the whole program static analysis 240. In further embodiments of the invention the language used for the intermediate representation will depend on the language used for the source code and the requirements of the specialised compiler.

The whole program static analysis 240 of the entire code base is performed at a level at which the compiler has visibility. The automated analysis identifies common code sequences in the intermediate representation 230, and determines an efficient set, or 'dictionary' of such subsequences, optimising the set for minimum overall code size. The whole program static analysis 240 then produces assembler source for the specialized library functions 250 that implements the common subsequences, and code transformation specifications in the form of specialized compiler components 260. Both the specialized library 250 and compiler components 260 have explicit knowledge of the code sequences that can be expected in the code base. The specialized library functions 250 are added to the linker libraries and are used, at the next compilation iteration, by the linker 285 when merging the compiled object files 280 to produce the complete executable program 290.

The specialized compiler components 260, including "peephole" code transformation specifications and instruction patterns, are used to rebuild the specialized compiler which is then able to immediately identify and replace instances of the common subsequences used in the code base. The rebuilt specialized compiler can then be used as the optimizing compiler 220 for the next iteration of the stable code base source code files 210.

Figure 3:
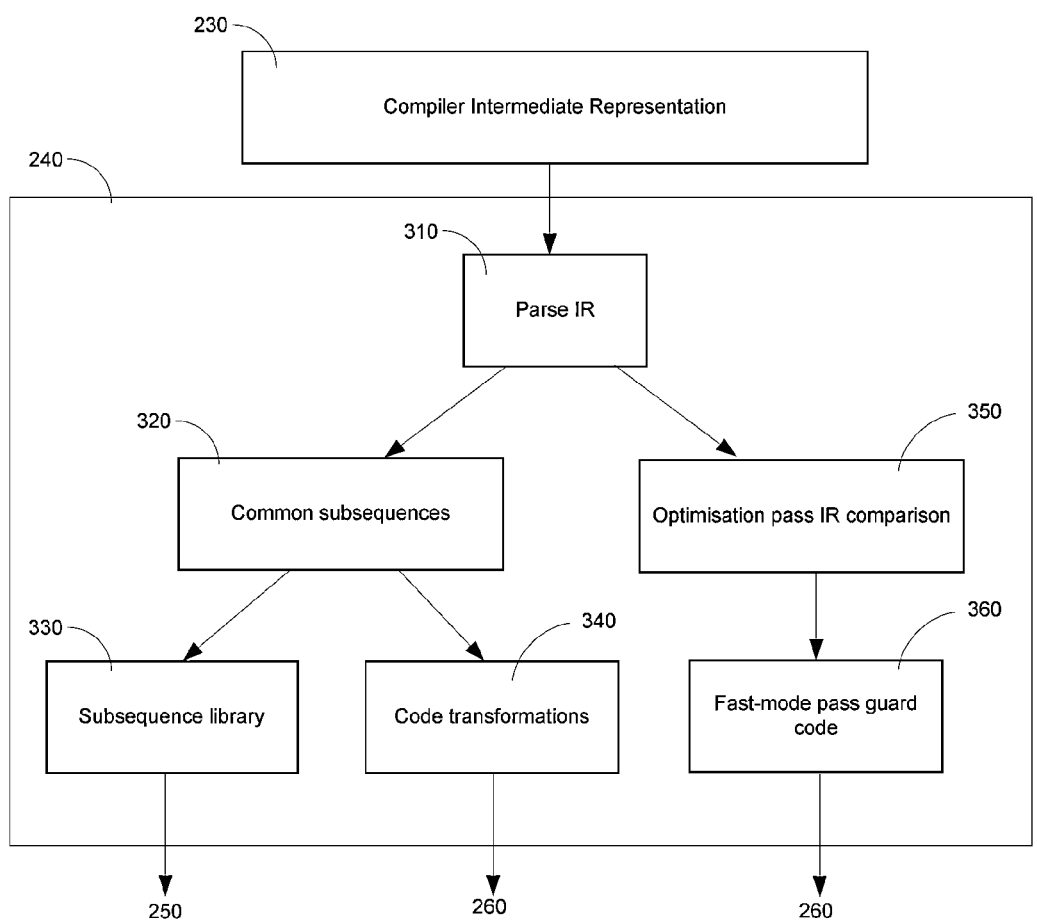
FIG. 3 shows a flow diagram of the whole program analysis used to produce the specialized components.

Referring to FIG. 3 a flow diagram of the whole program static analysis 240 used to produce the specialized components is shown. The compiler intermediate representation 230 is passed to a parser 310 which reconstructs the intermediate representation of the object code into a form that can be manipulated. Subsequences are identified using existing algorithms (such as that presented by S. Liao and Kurt Keutzler in "Code Density Optimization for Embedded DSP Processors Using Data Compression Techniques", 1998) in order to minimise the overall amount of space required for the complete executable program, as well as subsequence library routines and the program text including calls to those routines. The result is a set, or dictionary, of common subsequences 320, in the language of the compilers intermediate representation. Since this process takes place only when the specialised compiler is rebuilt, we can employ aggressive, time-consuming, optimisation techniques to find the optimal dictionary.

As shown in "Code Density Optimization for Embedded DSP Processors Using Data Compression Techniques", the problem of selecting the optimal dictionary may be expressed as an instance of the set cover problem. While this has been previously solved using Linear Programming Relaxation in the context of code compression, alternative methods consuming more processor time may feasibly be used to find more optimal solutions.

Genetic algorithm approaches may be used in this system, such as in "A Genetic Algorithm Approach for Set Covering Problems" by Wen-Chih Huang, Cheng-Yan Kao and Jorn-Tzong Horng. An exact solution via a branch-and-bound approach can also be feasible for some code bases.

For each common subsequence, the assembly code to implement the subsequence is generated and placed in the subsequence library 330. This library is then added to the common library to be used by the linker. Code transformation specifications 340, which specify a pattern that matches the common subsequence and the library call used to replace the common subsequence, are also generated.

Any subsequences which appear in the library but are unused (due to changes in the code base, or for any other reason) will be removed at final link time by conventional linker function elimination.

The code transformation specifications are formed by two components. The pattern component is a parameterised fragment of intermediate representation that matches the intermediate representation of a part of a program. Where there is an aspect of the pattern that does not have to match exactly, for example, the exact choice of registers used in the instruction, then this aspect is replaced with a match expression. The replacement pattern component is also a parameterised fragment of intermediate representation, specifying the instruction or instructions with which to replace the pattern-matched code whenever it is encountered in the code base being compiled. It can be parameterised so that the elements in the code which match the match expression can be referred to in the replacement code.

An example of a code transformation pattern, shown in simplified RTL, is given as follows:

```
(define_peephole2
;;    Pattern: match a 'shift' instruction followed by an 'add' instruction.
[   (set     (match_operand 0 "r")
             (ashift  (match_operand 1 "r")
                      (const_int 2 [0x2])))
    (set    (match_dup 0)
            (plus  (match_dup 0)
                   (match_operand 2 "r")))]
;; Replacement: replace with a function call to our generated library function.
[
    (set    (match_dup 0)
            (call   "generated_function_shift_add"  (match_dup 0)
                    (match_dup 1) (match_dup 2))
])
```

By including this rule in the specialised compiler, when the compiler finds a shift instruction, for example shifting by 2, and an add instruction which adds something else to that result, the pattern will match and the code will be replaced.

The intermediate representation code at the time that the transformation happens is similar to the patterns, with the exception that the "match_operand" and "match_dup" expressions are replaced by real operands in registers. The transformation is as follows:

```
        (set    (reg:SI r4)
                (ashift   (reg:SI r3)
                          (const_int 2 [0x2])))
        (set    (reg:SI r4)
                (plus   (reg:SI r4)
                        (reg:SI r5)))
``` is transformed into

```
(set    (reg:SI r4)
        (call "generated_function_shift_add"  (reg:SI r4) (reg:SI r3)
        (reg:SI r5)))
```

The generated library is created after the identification of a common subsequence to use as a pattern, following the regular compilation process on the pattern intermediate representation to turn it into assembly code. In the generated sequence library each identified common subsequence can be given its own section to allow linker elimination to remove any sequences that are not used. Sequence library use can be controlled by a compiler option, which both enables pattern recognition in the compiler and adds the library to the linked libraries. Multiple sequence libraries can be combined in a tools release, each controlled by its own flag.

According to an alternative embodiment of the invention, knowledge of function call sites in the stable codebase is used to predict the number of places a function will be called from when compiling that function. This information is used to guide a decision on whether to 'inline' the function. In prior-art solutions, a function will typically be inlined automatically if it has a single call-site, and the scope it is visible from is restricted to a single compilation unit. The compiler 220 takes this decision on the basis that inlining a function into the single place it is called from, rather than maintaining it as a separate function, will potentially increase performance without increasing overall code size. However, prior-art solutions can usually not inline functions with global scope as the compiler does not have knowledge of the function call sites across the entire codebase.

This limitation of prior-art solutions can be eliminated by using the techniques presented in this document. For example, if the a-priori knowledge gained from the whole program static analysis 240 indicates that a function, which has global scope, i.e. it may be called from any other compilation unit, happens to have only a single local call-site, the decision may be taken to inline without increasing code size. Hence, the use of a-priori knowledge from the whole codebase makes it possible for the optimizing compiler 220 to inline functions which would otherwise be ignored in prior-art solutions.

According to yet another alternative embodiment of the invention, a-priori knowledge from the stable code base is used to speed the compilation process. The optimizing compiler 220 typically performs many optimization passes which are run over the code being compiled. Typical passes first perform some analysis of the code, and as a result of the analysis may perform some transformations to the code.

During the whole program static analysis 240, the compiler 220 intermediate representation output, which contains the history of the optimization passes performed by the compiler, can be analyzed to determine whether each of the optimization passes had an effect on each of the functions of the stable codebase. This information can included in the specialized compiler components 260 so as to guide a "fast mode" added during the specialized compiler rebuild 270, which will skip optimization passes that are unlikely to improve the code quality for specific functions.

Using the history contained in the compiler 220 intermediate representation output, a function's intermediate representation before each optimization pass is compared to its intermediate representation after the pass by the optimization pass intermediate representation comparison process 350. If the optimization pass had no effect on the function's intermediate representation, this is noted in a list. This list is used by the fast-mode pass guard code process 360 to construct a guard function for each pass, which may skip the optimization pass, in "fast mode", for functions on which it is predicted it will have no useful effect. These guard functions can be included in the specialized compiler components 260 and to then be incorporated into the specialized optimizing compiler during the rebuild process 270.

Figure 4:
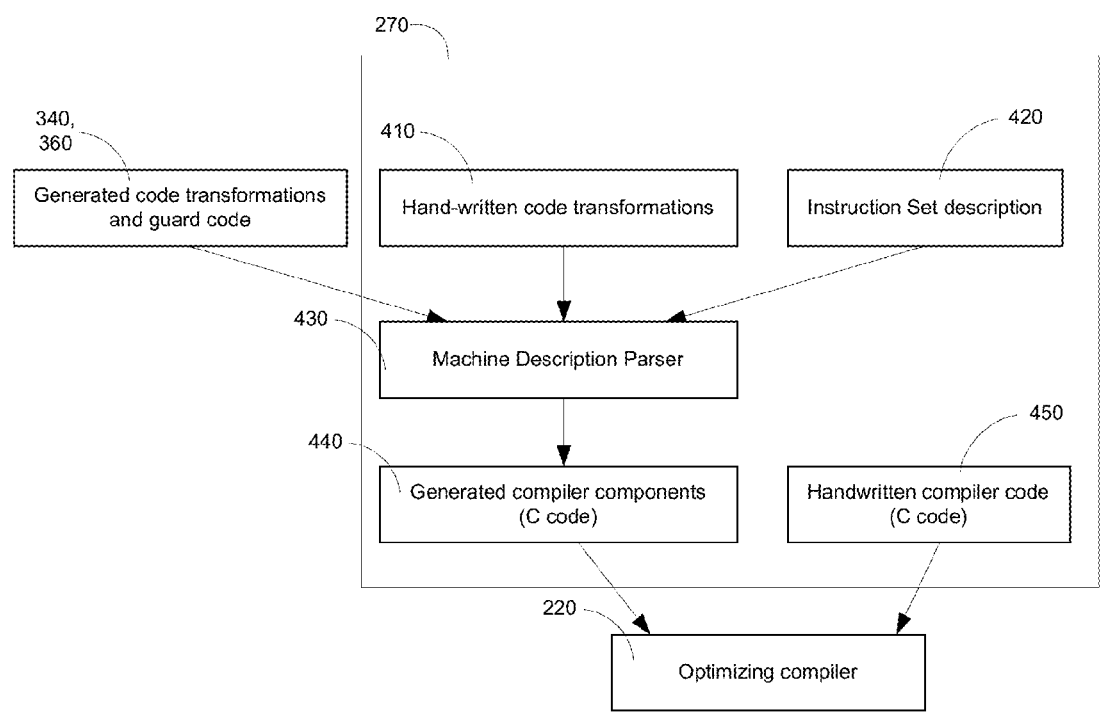
FIG. 4 shows a flow diagram of the compiler rebuild sequence.

Referring to FIG. 4 a flow diagram of the compiler rebuild sequence is shown. The code transformation specifications are included in the specialized compiler components 260 and are an input to the specialized compiler rebuild 270. The transformation specifications 340, guard code 360, hand written code transformations 410 and the instruction set architecture description (ISA) 420 are processed by machine description parser 430 in the GCC build system to generate custom compiler components 440 in C code. These are compiled and linked with the compiler's hand written source code 450 to create the specialised optimizing compiler 220. The compiler can then be re-used in the compilation sequence to improve the optimisation of the code base. The specialised compiler is faster than link-time optimisation or interprocedural optimisation since it has explicit knowledge of the code base and by using the specialized library can arrive at the correct code sequences immediately.

Although the apparatus, system, and method are illustrated and described herein as embodied in one or more specific examples, it is nevertheless not intended to be limited to the details shown, since various modifications and structural changes may be made therein without departing from the scope of the apparatus, system, and method, and within the scope and range of equivalents of the claims. Accordingly, it is appropriate that the appended claims be construed broadly and in a manner consistent with the scope of the apparatus, system, and method, as set forth in the following claims.

What is claimed is:

1. A compiling method for compiling a source code file in a code base, the method comprising:
    compiling the source code file in the code base using an optimizing compiler specialized to the code base and accordingly generating an intermediate representation;
    analyzing the intermediate representation to obtain and store characteristics of the code base, wherein the intermediate representation is not itself further modified;
    recompiling the code base with the optimizing compiler using the characteristics of the code base,
    obtaining reusable resources from the characteristics of the code base; and
    optimizing compiled code using the reusable resources for use in the recompiling step; and
    rebuilding the optimized compiler according to (i) the reusable resources for use in the recompiling step, (ii) transformation specifications, which specify a pattern that matches a common subsequence and a library call that is used to replace the common subsequence, and (iii) guard code, which is used to skip a given optimization pass.

2. The compiling method of claim 1, wherein the reusable resources comprise a plurality of common code subsequences that are found multiple times in the code base.

3. The compiling method of claim 2, wherein optimizing the compiled code using the reusable resources comprises:
    identifying the common code subsequences in the code base; and
    optimizing size of the compiled code according to the common code subsequences.

4. The compiling method of claim 2, further comprising:
    outputting compiled object files from compiling the source code file; and
    linking the complied object file to generate an executable program.

5. The compiling method of claim 4, wherein linking the compiled object files further comprises linking the compiled object files using a specialized library implementing the common code subsequences and a linker library.

6. The compiling method of claim 1, further comprising:
    obtaining history of a plurality of optimization passes; and
    analyzing the history of the optimizing passes to determine whether each optimization pass has an effect on at least one of a plurality of functions in the code base.

7. The compiling method of claim 6, further comprising determining whether to skip any of the optimizing passes based on a result of the analyzing step.

8. The compiling method of claim 1, wherein the characteristics of the code base comprise information on a location of calls to at least one of a plurality of functions in the code base.

9. The compiling method of claim 8, further comprising using the information on the location of calls to the at least one of a plurality of functions to determine whether the at least one of plurality of functions in the code base is compiled inline.

\* \* \* \* \*